No. 868,079. PATENTED OCT. 15, 1907.
H. B. EWBANK, Jr.
TIRE FOR WHEELS.
APPLICATION FILED JULY 25, 1906.
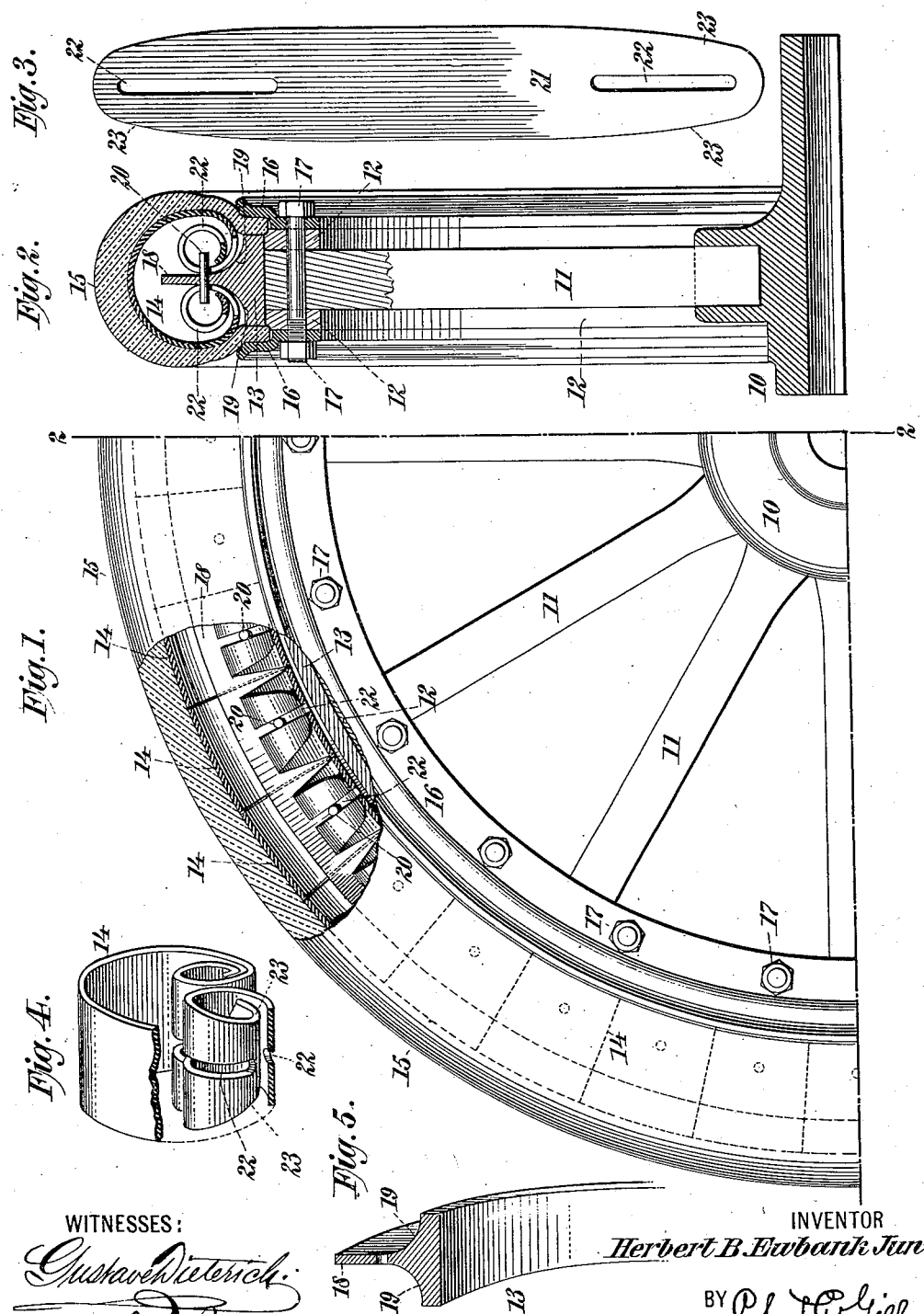
WITNESSES:
INVENTOR
Herbert B. Ewbank Jun.
BY
ATTORNEY

UNITED STATES PATENT OFFICE.

HERBERT B. EWBANK, JR., OF NEW YORK, N. Y., ASSIGNOR TO HARRY A. TAYLOR, OF NEW YORK, N. Y.

TIRE FOR WHEELS.

No. 868,079.   Specification of Letters Patent.   Patented Oct. 15, 1907.

Application filed July 25, 1906. Serial No. 327,615.

*To all whom it may concern:*

Be it known that I, HERBERT B. EWBANK, Jr., a citizen of the United States, and a resident of New York city, in the county of New York and State of New York, have invented certain new and useful Improvements in Tires for Wheels, of which the following is a specification.

The invention relates to improvements in tires for the wheels of vehicles, and it consists in the novel features, arrangements and combinations of parts hereinafter described, and particularly pointed out in the claims.

The object of the invention is to produce an efficient hollow cushion-tire in which, in lieu of the employment of a pneumatic tube, the tread is supported upon transverse convolute springs adapted to have a yielding action upon the means retaining them in properly spaced relation.

In carrying out my invention I apply closely upon the felly of the wheel a metal band, preferably in two semi-circular parts, having a central outwardly extending annular flange carrying a series of transverse pins projecting laterally from both sides of the flange and equally spaced around the wheel, and upon the said pins I arrange the ends of convolute plate springs which bow outwardly from and across said band and have their ends spirally coiled to fit against the flange on said band and slotted to pass upon said pins. Upon the series of springs is closely arranged the tire proper, which is of rubber and has its edges clamped against the sides of the aforesaid band by means of flanges which are secured to the sides of the felly by bolts extending transversely through the same and said flanges.

The invention will be fully understood from the detailed description hereinafter presented, reference being had to the accompanying drawings, in which:

Figure 1 is a side elevation, partly broken away and partly in section, of a portion of a wheel equipped with a tire embodying my invention; Fig. 2 is a transverse section through a portion of the wheel; Fig. 3 is an enlarged plan view of one of the plates from which the springs are formed; Fig. 4 is an enlarged detached perspective view, partly broken away, of one of the springs; and Fig. 5 is a detached perspective view of a portion of the band.

In the drawings, 10 designates the hub of the wheel, 11 the spokes, 12 the felly, 13 the band applied upon said felly, 14 the springs, 15 the rubber tire, 16 the metal flanges securing the tire in place, and 17 the bolts extending through the felly and flanges and securing the latter.

The hub, spokes, felly, flanges 16 and bolts 17 require no special description.

The band 13 extends entirely around the wheel and closely engages the periphery of the felly, and said band is preferably formed in two semi-circular sections. The band 13 is of substantial thickness and formed with the central vertical annular flange 18 which curves outwardly at opposite sides of its base to form curved seats 19 for the end portions of the springs 14. The flange 18 is provided with a series of transverse pins 20 whose ends form laterally projecting studs extending from opposite sides of said flange, as shown in Fig. 2.

The springs 14 are formed from plates 21 (Fig. 3) having slots 22 and ends whose edges are on converging lines, as at 23, the ends of the plate being thus tapered and of less width than the middle portions thereof. The outline of the springs 14 is shown in Figs. 2 and 4, from which it may be seen that they are bowed outwardly at their middle portions and thence turn inwardly and are spirally coiled in opposite directions at their ends, which ends are on opposite sides of the vertical flanges 18 and seat against the same. The springs 14, at their ends, receive the ends of the pins 20, the latter extending through the slots 22 of the springs and serving to retain the springs in proper relation to the band 13 and to each other.

The rubber tire 15 fits snugly upon the springs 14 and has its edges clamped against the side edges of the band 13 by means of the flanges 16 and bolts 17.

My invention resides more particularly in the springs 14 and band 13, the latter affording seats and retaining means for the springs. The springs 14 when free of the parts inclosing them will not spread out to the flat position shown in Fig. 3, but will separate somewhat at their end portions, this condition of the springs serving to keep their outer portions in firm contact at all times with the inner walls of the tire 15. The springs 14 afford reliable resilient means for keeping the tire 15 distended and constitute a cushion. During the compression and expansion of the springs when in use their inner curved ends may slide upon the flange of the band 13, being guided in such movements by the pins 20 and edges of the slots 22. It is of advantage also that the pins 20 engage the springs at their upwardly curved ends, rather than at points down close to the rim of the wheel, since thereby I am enabled to secure a better spring action and avoid liability of breakage of the springs when the same are under compression. The flange 18 separates the adjoining ends of the springs, and hence in the use of the wheel each end of a spring may have such movement as may be required of it without directly influencing the other end of the spring.

My invention not only affords a highly efficient and durable spring tire construction but one adapted to the solid felly of ordinary wheels.

What I claim as my invention and desire to secure by Letters-Patent, is:

1. A wheel having on its periphery a central vertical annular flange having concave seats at its opposite sides, a series of outwardly bowed transverse plate springs arranged around the wheel with their adjoining ends coiled and disposed at opposite sides of said flange in sliding engagement with said seats, means retaining said springs and guiding them in their sliding movements against said seats, and an exterior rubber tire inclosing said springs and secured to the wheel; substantially as set forth.

2. A wheel having on its periphery a central vertical annular flange, a series of outwardly bowed transverse plate springs arranged around the wheel with their adjoining ends coiled and disposed at opposite sides of said flange, means on said flange for retaining and guiding the ends of said springs in their sliding movements, and an exterior rubber tire inclosing said springs and secured to the wheel; substantially as set forth.

3. A wheel having on its periphery a central vertical annular flange provided with studs extending laterally from its sides, a series of outwardly bowed transverse plate springs arranged around the wheel with their adjoining ends coiled and disposed at opposite sides of and in sliding engagement with said flange and slotted to pass upon said studs, and an exterior rubber tire inclosing said springs and secured to the wheel, said slots being elongated to permit the ends of said springs to have a sliding movement on said flange and to guide them in such movement; substantially as set forth.

4. A wheel having on its felly a close-fitting metal band equipped with a central vertical annular flange, a series of outwardly bowed transverse plate springs arranged around the wheel with their adjoining ends coiled and disposed at opposite sides of said flange, means on said flange for retaining and guiding the ends of said springs in their sliding movements, an exterior rubber tire inclosing said springs, and flanges secured to said felly and clamping the edges of said tire; substantially as set forth.

5. A wheel having on its felly a close-fitting metal band equipped with a central vertical annular flange provided with studs extending laterally from its sides, a series of outwardly bowed transverse plate springs arranged around the wheel with their adjoining ends coiled and disposed at opposite sides of and in sliding engagement with said flange and slotted to pass upon said studs, an exterior rubber tire inclosing said springs, and flanges secured to said felly and clamping the edges of said tire, the slots in the ends of said springs being elongated to permit said ends to have a sliding movement on said flange and to guide them in such movement; substantially as set forth.

Signed at New York city, in the county of New York and State of New York this 24th day of July A. D. 1906.

HERBERT B. EWBANK, JUNIOR.

Witnesses:
ARTHUR MARION,
CHAS. C. GILL.